United States Patent [19]
Taylor et al.

[11] Patent Number: 5,259,471
[45] Date of Patent: Nov. 9, 1993

[54] TRAILER DOLLY APPARATUS

[76] Inventors: Robert J. Taylor; Judy L. Taylor, both of 5512 Council Ring Blvd., Kokomo, Ind. 46902; Donald L. Price; Linda S. Price, both of R.R. #1, Box 197, Walton, Ind. 46884

[21] Appl. No.: 907,581

[22] Filed: Jul. 2, 1992

[51] Int. Cl.$^5$ .............................................. B62D 53/04
[52] U.S. Cl. ..................................... 180/12; 180/19.2
[58] Field of Search .................. 180/11, 12, 19.1, 19.2, 180/19.3

[56] References Cited

U.S. PATENT DOCUMENTS

| | | | |
|---|---|---|---|
| 3,861,483 | 1/1975 | Pavelka | 180/12 X |
| 3,942,823 | 3/1976 | Shields et al. | 180/19.1 X |
| 4,799,398 | 1/1989 | Asano | 180/19.1 X |
| 4,799,698 | 1/1989 | Markovic | 180/19.1 X |

Primary Examiner—Joseph D. Pape
Attorney, Agent, or Firm—Hugh E. Smith

[57] ABSTRACT

A trailer dolly arranged for receiving a trailer hitch thereto to permit ease and mobility of a trailer. A support platform includes a forward wheel pivotally mounted relative to the platform, with a plurality of rear wheels, with at least one of the wheels in operative communication with a drive motor. A trailer hitch ball is mounted projecting upwardly of the support platform to receive a trailer hitch thereon. A modification of the invention includes the trailer hitch ball mounted within a cylinder, with a piston reciprocatably mounted within the cylinder mounting the ball at its upper distal end to permit lifting of a trailer as required for its mobility about a support surface.

1 Claim, 5 Drawing Sheets

TRAILER DOLLY APPARATUS

BACKGROUND OF THE INVENTION

1. Field of the Invention

The field of invention relates to trailer apparatus, and more particularly pertains to a new and improved trailer dolly apparatus wherein the same permits ease of mobile movement of a trailer.

2. Description of the Prior Art

Frequently, it is desired by individuals to reposition trailers and the like. To effect such, the tow vehicle, such as a car, truck, and the like, must be secured to the trailer. The instant invention attempts to overcome deficiencies of the prior art by providing for a dolly structure arranged for ease of manipulation and displacement relative to the trailer for mounting the trailer thereto.

Prior art trailer coupling and mounting structure is exemplified in U.S. Pat. No. 4,148,497 to Gentry, as well as a tractor-trailer interconnection as set forth in the U.S. Pat. No. 4,133,552 to Sheine.

A storage dolly for supporting a forward end of a wrecked automobile during towing for storage beneath a towing vehicle is set forth in the U.S. Pat. No. 3,929,237 to Schaedler.

As such, it may be appreciated that there continues to be a need for a new and improved trailer dolly apparatus as set forth by the instant invention which addresses both the problems of ease of use as well as effectiveness in construction in manipulation of the trailer structure and in this respect, the present invention substantially fulfills this need.

SUMMARY OF THE INVENTION

In view of the foregoing disadvantages inherent in the known types of trailer apparatus now present in the prior art, the present invention provides a trailer dolly apparatus wherein the same is arranged for supporting and manipulation of a trailer secured to the dolly structure. As such, the general purpose of the present invention, which will be described subsequently in greater detail, is to provide a new and improved trailer dolly apparatus which has all the advantages of the prior art trailer dolly apparatus and none of the disadvantages.

To attain this, the present invention provides a trailer dolly arranged for receiving a trailer hitch thereto to permit ease and mobility of a trailer. A support platform includes a forward wheel pivotally mounted relative to the platform, with a plurality of rear wheels, with at least one of said wheels in operative communication with a drive motor. A trailer hitch ball is mounted projecting upwardly of the support platform to receive a trailer hitch thereon. A modification of the invention includes the trailer hitch ball mounted within a cylinder, with a piston reciprocatably mounted within the cylinder mounting the ball at its upper distal end to permit lifting of a trailer as required for its mobility about a support surface.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trailer dolly apparatus which has all the advantages of the prior art trailer dolly apparatus and none of the disadvantages.

It is another object of the present invention to provide a new and improved trailer dolly apparatus which may be easily and efficiently manufactured and marketed.

It is a further object of the present invention to provide a new and improved trailer dolly apparatus which is of a durable and reliable construction.

An even further object of the present invention is to provide a new and improved trailer dolly apparatus which is susceptible of a low cost of manufacture with regard to both materials and labor, and which accordingly is then susceptible of low prices of sale to the consuming public, thereby making such trailer dolly apparatus economically available to the buying public.

Still yet another object of the present invention is to provide a new and improved trailer dolly apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
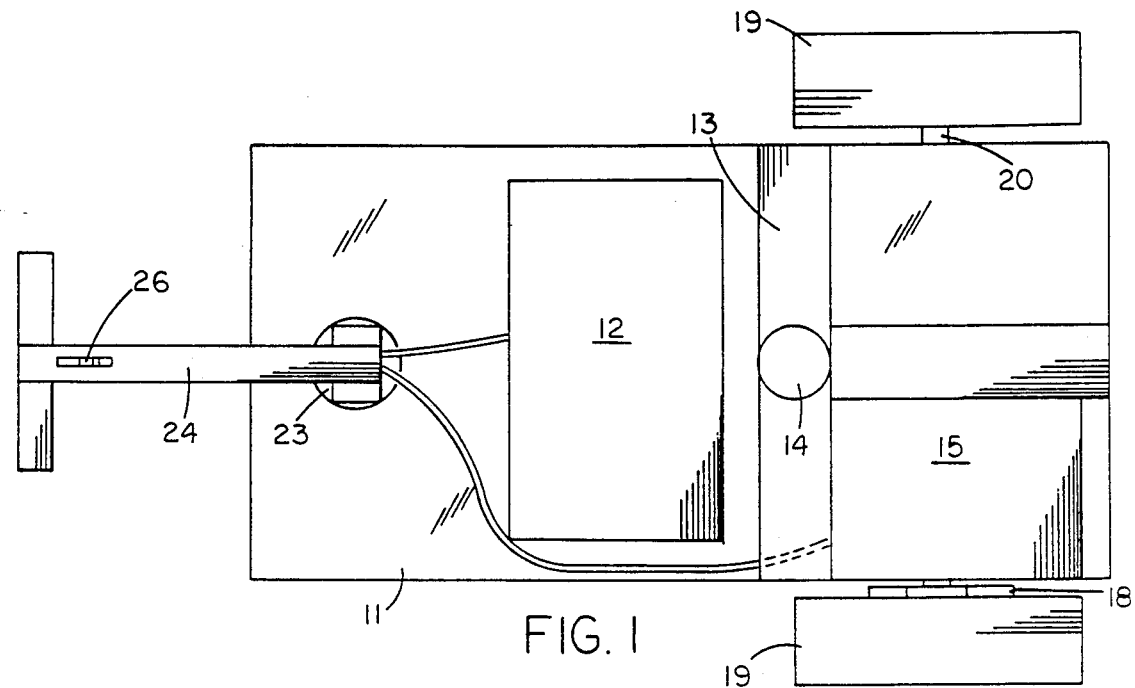
FIG. 1 is an orthographic top view of the instant invention.
Figure 2:
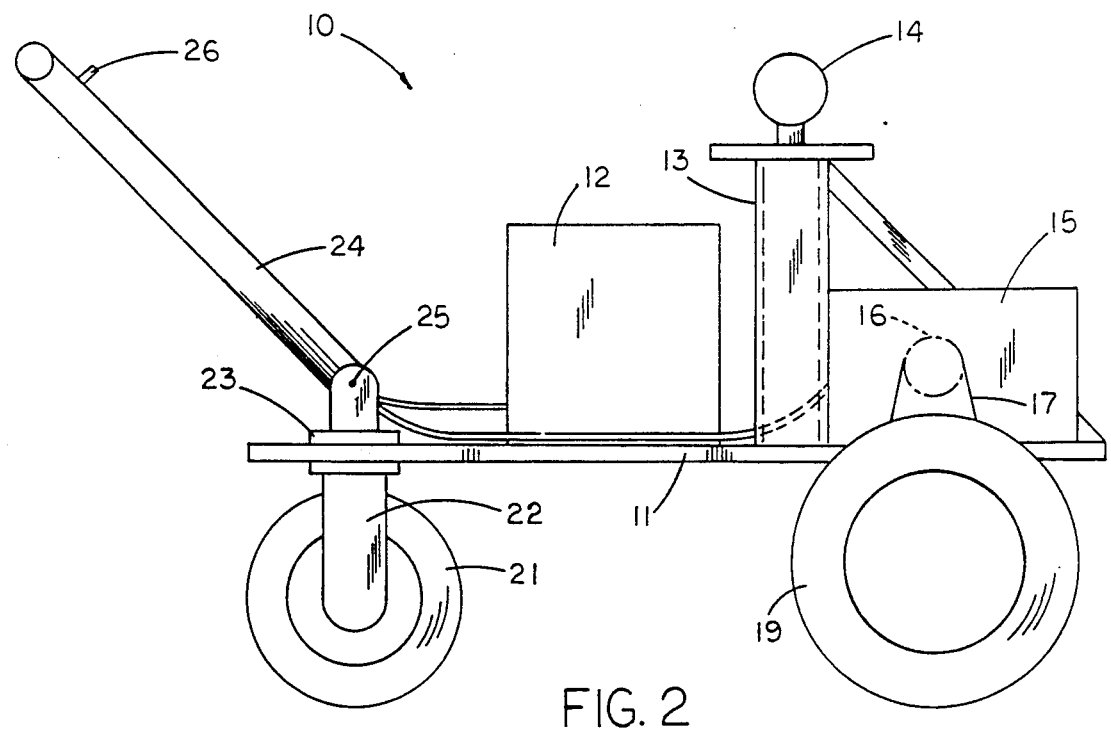
FIG. 2 is an orthographic side view of the instant invention.
Figure 3:
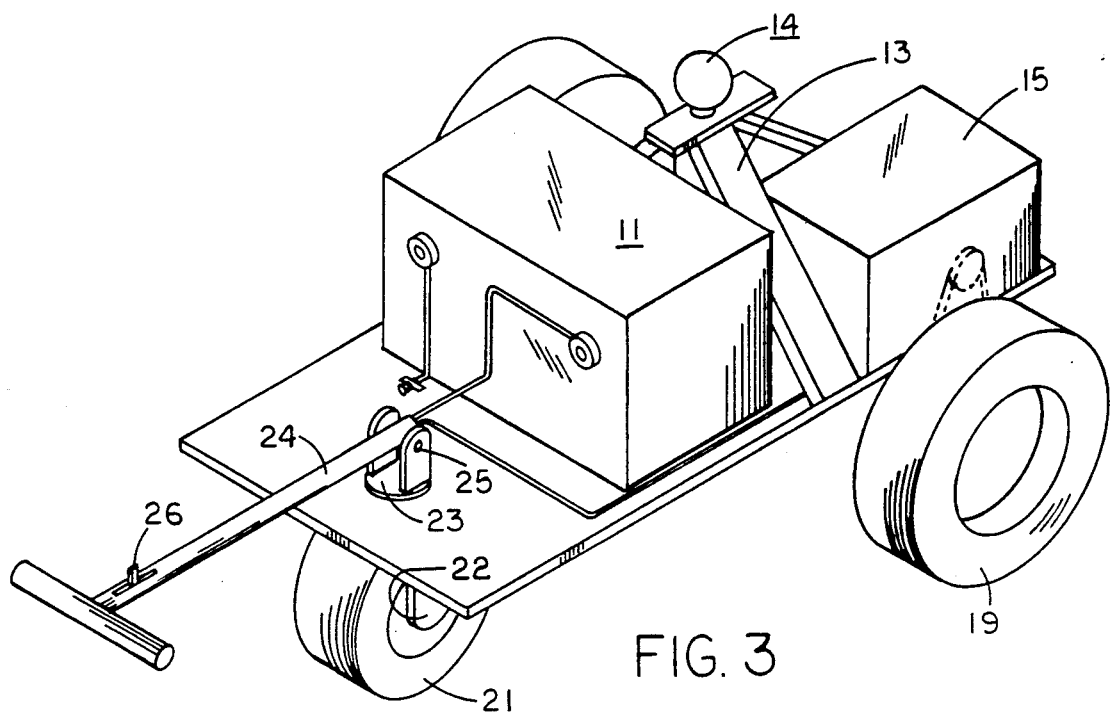
FIG. 3 is an isometric illustration of the instant invention.

With reference now to the drawings, and in particular to FIGS. 1 to 12 thereof, a new and improved trailer dolly apparatus embodying the principles and concepts of the present invention and generally designated by the reference numerals 10 and 10a will be described.

More specifically, the trailer dolly apparatus 10 of the instant invention essentially comprises a support platform 11 mounting a storage battery 12 thereon. A support mount 13 positions a trailer ball 14 at its upper distal end, wherein the trailer ball is arranged for reception of a trailer hitch (not shown) of conventional configuration. A drive motor 15 is mounted to the support platform rearwardly of the support mount 13, including a drive motor output pulley 16 to drive a driven pulley 18 mounted to a wheel member axle 20 utilizing a drive belt 17 or drive chain, as required. It should be understood that reduction gearing may be implemented to provide whatever torque multiplication is necessitated in manipulation of a trailer relative to the apparatus 10. The wheel member axle 20 mounts a drive wheel member 19 at each end thereof. A front wheel 21 is positioned medially of the platform and the drive wheels 19, with the front wheel 21 positioned at a forward end of the platform and the drive wheels positioned adjacent a rear end of the platform. A bifurcated support 22 rotatably mounts the front wheel 21 therewithin, wherein the bifurcated mount 22 includes a swivel connection 23 mounted through the support platform for manipulation of the front wheel in a pivotal relationship relative to the support platform. A handle 24 pivotally mounted to an upper portion of the swivel connection 23 about a handle axle 25 permits pivoting of the elongate handle relative to the swivel connection 23. An on/off switch 26 is mounted adjacent an upper distal end of the handle for selective actuation of the drive motor 15 by way of the battery 12.

Figure 4:
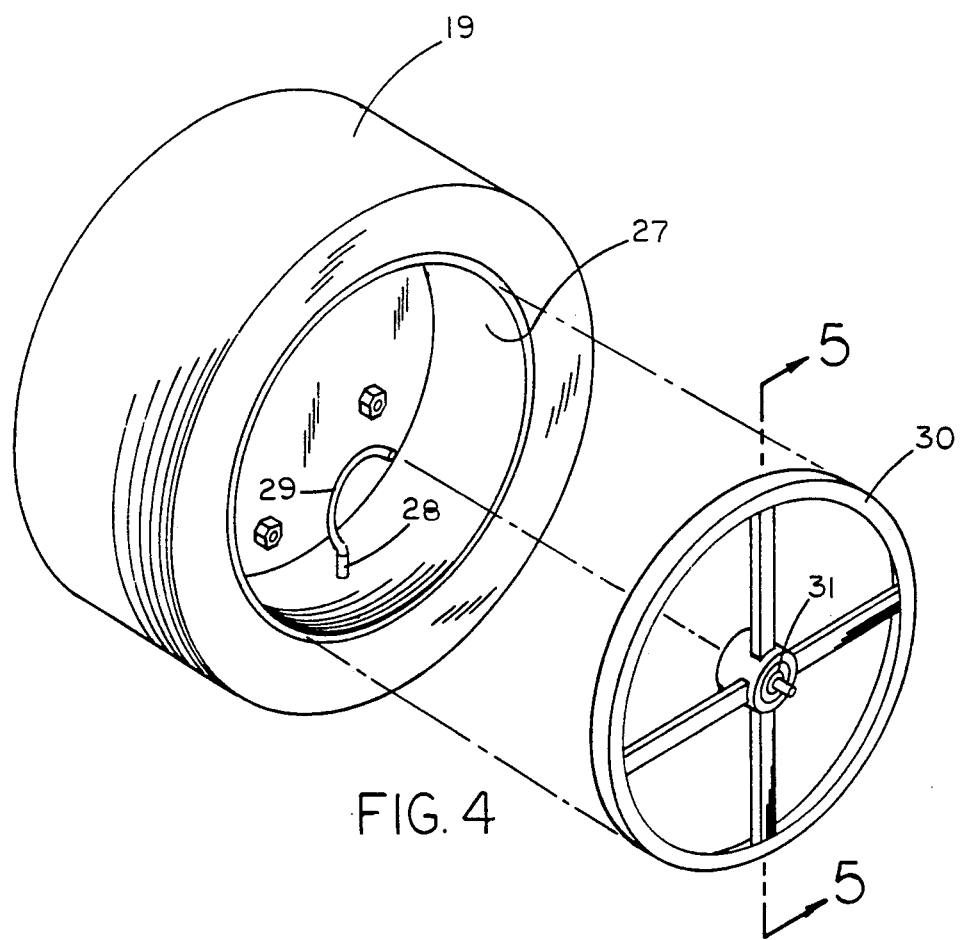
FIG. 4 is an isometric exploded view of a modified rear wheel structure utilized by a modification of the invention.
Figure 5:
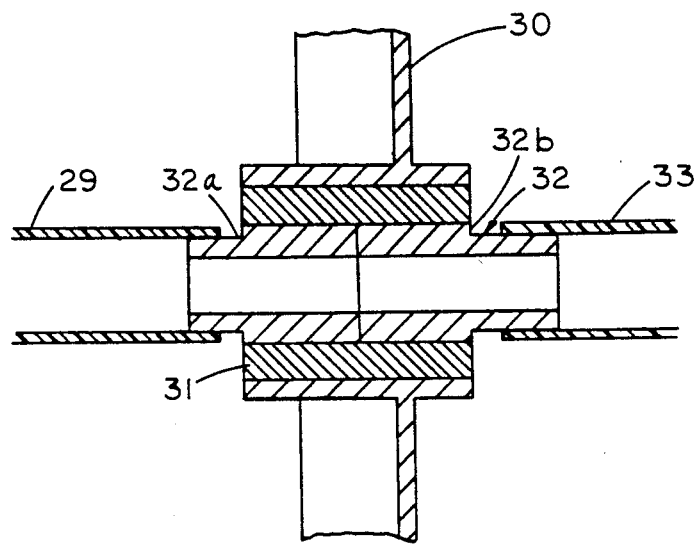
FIG. 5 is an orthographic view, taken along the lines 5—5 of FIG. 4 in the direction indicated by the arrows.
Figure 6:
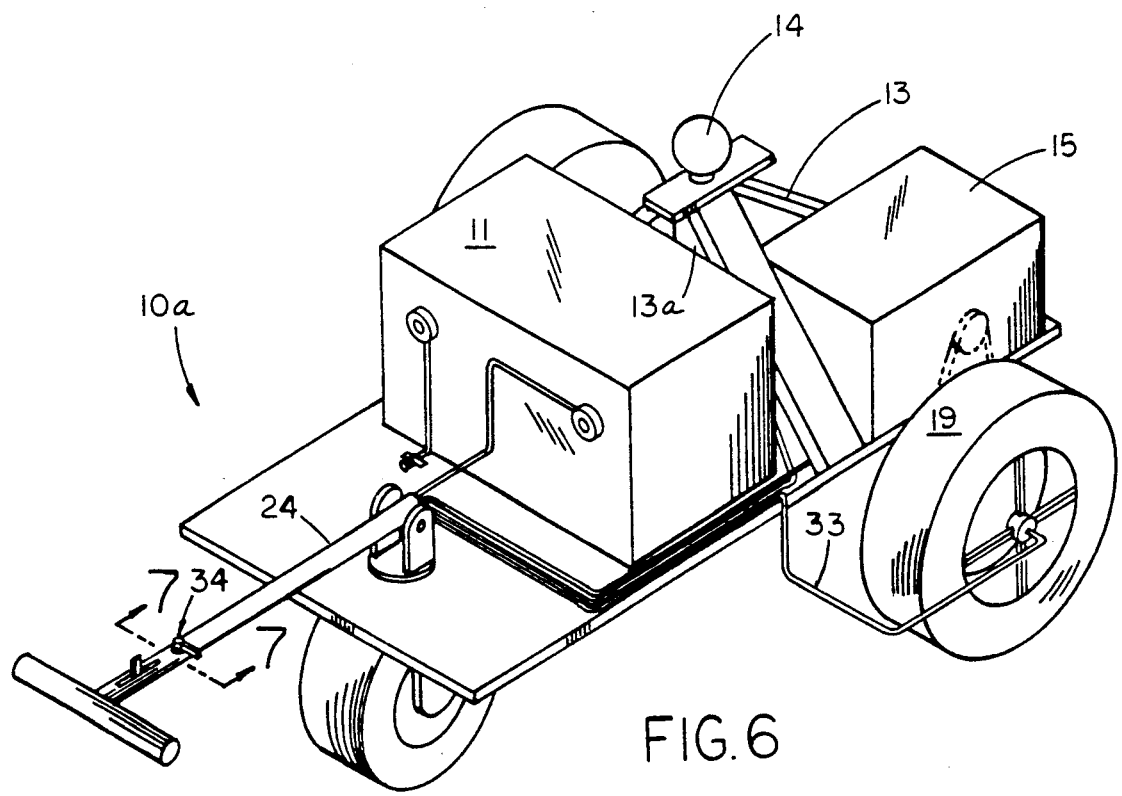
FIG. 6 is an isometric illustration of a modification of the invention.
Figure 7:
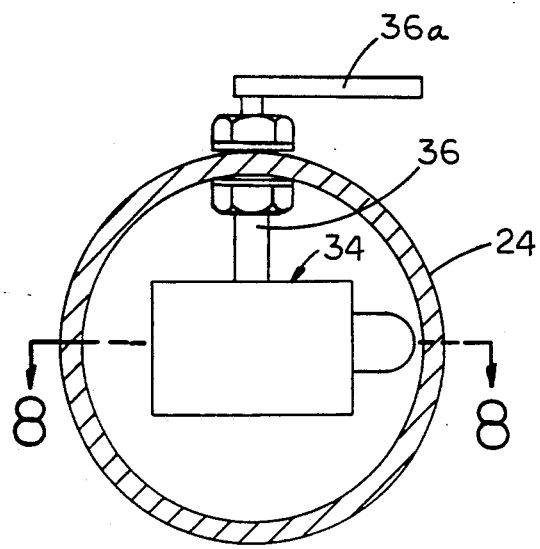
FIG. 7 is an orthographic view, taken along the lines 7—7 of FIG. 6 in the direction indicated by the arrows.
Figure 10:
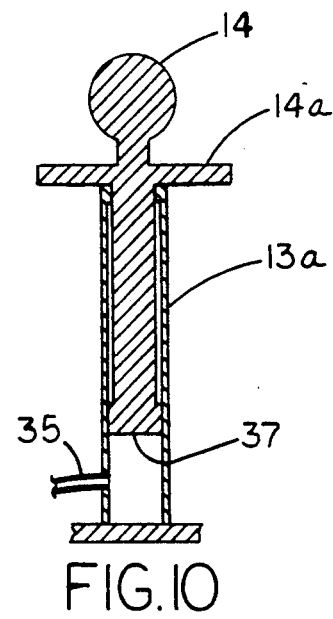
FIG. 10 is an orthographic cross-sectional illustration of the support cylinder structure as utilized by the modification of the invention.

The FIG. 6 illustrates a modified apparatus 10a to include at least one drive wheel 19, of a type as illustrated in FIG. 4, wherein a rear wheel cylindrical support rim 27 includes an inflation valve 28 directed therethrough. The inflation valve 28 is in pneumatic communication with an inflation hose 29. The inflation hose 29 is directed coaxially to a guide wheel 30 that in turn is fixedly mounted within the support rim 27. With specific reference to FIG. 5, the guide wheel 30 includes a guide wheel axial bushing 31 positioned medially and coaxially of the guide wheel rotatably mounting a respective first and second guide tube member 32a and 32b of a guide tube 32 that is rotatably mounted within the guide bushing 31. The first guide tube member 32a fixedly receives the inflation hose 29 thereto, wherein the second guide tube member 32b mounts a first pneumatic conduit 33 thereto permitting selective and relative rotation of the first guide tube member 32a relative to the second guide tube member 32b, whereupon rotation of the inflation hose 29 relative to the guide bushing 31 does not effect rotation of the first pneumatic conduit 33. The first pneumatic conduit 33 is directed into a pneumatic valve 34 mounted to the handle 24 adjacent the on/off switch 26. The valve 34 effects selective pneumatic communication of the first pneumatic conduit 33 with a second pneumatic conduit 35 directed into a support cylinder 13a mounting telescopingly a piston 37 therewithin, wherein the upper distal end of the piston fixedly mounts a trailer ball 14, with a ball abutment flange 14a positioned adjacent the piston controls retraction of the piston 37 within the support cylinder 13a, in a manner as illustrated in FIG. 10.

Figure 8:
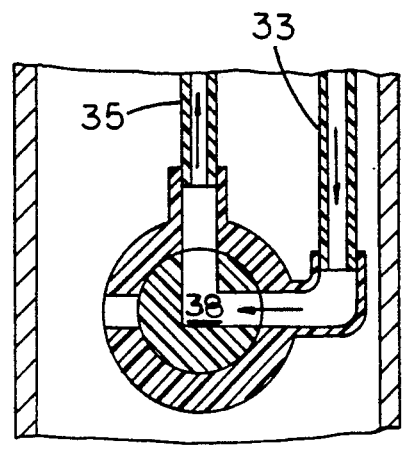
FIG. 8 is an orthographic view, taken along the lines 8—8 of FIG. 7 in the direction indicated by the arrows, illustrating the valve configured in a first position.
Figure 9:
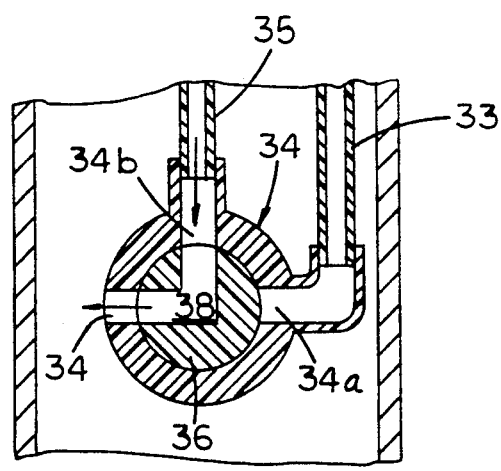
FIG. 9 is an orthographic cross-sectional illustration of the valve configured in a second position for venting of the support cylinder of the invention.

The valve includes a valve shaft 36, with a handle 36a at its upper distal end permitting rotation of the valve shaft 36 that includes an "L" shaped valve conduit 38 to effect pneumatic communication of the first pneumatic conduit 33 with the second pneumatic conduit 35 in a first position and permitting venting of the second pneumatic conduit 35 to permit retraction of the piston 37 within the support cylinder 13a in a second position, as illustrated in the FIGS. 8 and 9 respectively. The valve 34 accordingly includes a respective first, second, and third valve port 34a, 34b, and 34c, wherein the first valve port 34a is offset ninety degrees relative to the second valve port 34b, wherein the first position is arranged in pneumatic communication to one another, wherein the third valve port 34c arranged diametrically aligned with the first valve port 34a is in pneumatic communication with the second conduit 35 in the second position to effect venting of the support cylinder 13a. The drive wheel 19 and its pneumatic tire accordingly provides for a pneumatic reservoir and does not effect tire use as relatively little pressure is required for the lifting and depressing of the trailer ball 14 to effect selective lifting of a trailer (not shown).

Figure 11:
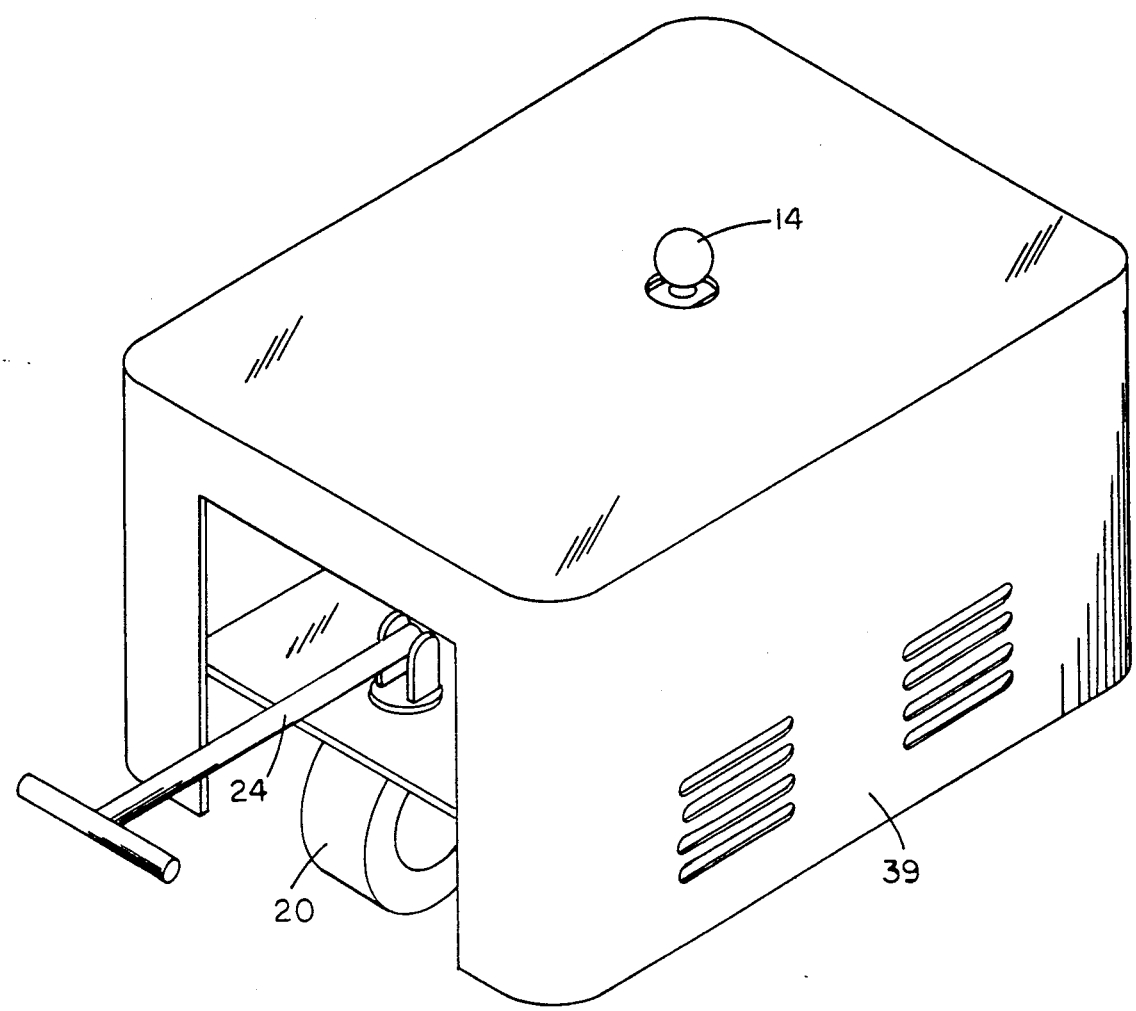
FIG. 11 is an isometric illustration of the invention utilizing a cover structure.
Figure 12:
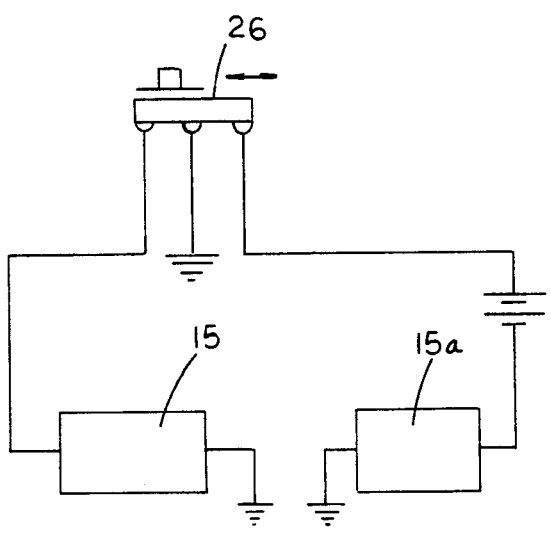
FIG. 12 is a schematic illustration of an on/off switch structure utilized by the invention when employing a plurality of drive motors.

The FIG. 11 illustrates the use of a vented housing cover 39 for covering of the structure, including a housing front entrance to permit pivotment of the handle therewithin. The use of an auxiliary drive motor 15a in operative communication with the switch 26, as illustrated in diagrammatic form in FIG. 12, should the duality of electric drive motors be utilized for a backup to the first drive motor in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer dolly apparatus, comprising:

a support platform, the support platform including a platform forward end and a platform near end spaced from the forward end, and a storage battery mounted to a top surface of the platform adjacent the forward end, and a support mount mounted fixedly to the support platform projecting upwardly thereof above the storage battery, and a drive motor mounted to the support platform rearwardly of the support mount, and the support mount including a trailer bail mounted to an upper distal end of the support mount, and a plurality of drive wheels mounted to a drive axle, the drive axle mounted below the support platform in operative communication with the drive motor, and a forward wheel pivotally mounted adjacent a forward end of the platform, and a handle member mounted to the forward wheel to effect selective pivoting of the forward wheel, and a switch means mounted to the handle for effecting selective actuation of the drive motor through the storage battery to effect selective rotation of at least one wheel number, and a bifurcated support, the forward wheel rotatably mounted within the bifurcated support, the bifurcated support includes a swivel connection mounted to an upper distal end of the support, with the swivel connection rotatably mounted within the support platform, and the handle including a handle lower distal end, the handle lower distal end including a handle axle directed through the swivel connection permitting pivoting of the handle relative to the swivel connection, and at least one rear wheel member includes a wheel cylindrical support rim, the cylindrical support rim includes an inflation valve in pneumatic communication with a pneumatic tire mounted about the at least one rear wheel member, and the inflation valve including an inflation hose in pneumatic communication with the inflation valve, and a guide wheel mounted within the support rim, the guide wheel including an axial bushing coaxially mounted through the guide wheel, and a first guide tube and a second guide tube positioned in end to end relationship directed through the axial bushing in relative rotational relationship relative to the axial bushing, wherein the first guide tube member includes the inflation hose directed thereto, and the second guide tube member includes a first pneumatic conduit directed thereto, wherein the first pneumatic conduit and the inflation hose are in pneumatic communication through the first guide tube member and the second guide tube member, and a pneumatic valve mounted to the handle adjacent the switch, and the first pneumatic conduit directed to the pneumatic valve, and a second pneumatic conduit in pneumatic communication with the pneumatic valve, wherein the pneumatic valve includes a valve shaft, the valve shaft rotatable from a first position to effect pneumatic communication between the first pneumatic conduit and the second pneumatic conduit, and the valve including an exit port, wherein rotation of the valve shaft to a second position effects pneumatic communication of the second pneumatic conduit with the exit port, and the support mount including a support cylinder, the support cylinder including a piston reciprocatably mounted therewithin, and the second pneumatic conduit directed into the support cylinder below the piston, and an upper distal end of the piston including the trailer ball fixedly secured thereto, whereupon displacement of the valve shaft to the first position effects projection and extension of the piston relative to the support cylinder, and rotation of the valve shaft to the second position effects retraction of the piston within the support cylinder.

* * * * *